United States Patent [19]

Riba

[11] 3,747,319
[45] July 24, 1973

[54] ROTATABLE DISPLAY CLOCK

[76] Inventor: Morris Riba, 2881 W. 12th St., Brooklyn, N.Y. 11224

[22] Filed: Oct. 20, 1972

[21] Appl. No.: 299,484

[52] U.S. Cl............................ 58/2, 58/28 A, 58/45, 58/127 R, 58/152 R
[51] Int. Cl...................... G04b 45/00, G04b 37/00
[58] Field of Search................ 58/1, 2, 28 R, 28 A, 58/45, 127, 152 R

[56] References Cited
UNITED STATES PATENTS
3,465,510  9/1969  Jeanmonod...................... 58/109 X FOREIGN PATENTS OR APPLICATIONS
1,236,604  6/1960  France.................................. 58/44
1,181,136  6/1958  Germany............................. 58/44

Primary Examiner—Richard B. Wilkinson
Assistant Examiner—Edith C. Simmons Jackmon
Attorney—Stanley Wolder

[57] ABSTRACT

A display clock includes a base upon which a clock body is mounted for free rotation about a vertical axis. The clock body includes a housing having a vertically extending dial defining front face and a battery energized clock motor is mounted on the front face and drives the clock hands. The clock motor includes a pair of coaxial balance wheels which oscillate about a vertically extending axis and a battery energized network periodically pulses a pair of magnets on the balance wheels to maintain the balance wheel oscillation. With the oscillation of the balance wheel the clock body reacts to oscillate, in an opposite phase, the oscillating stroke of the body depending on the moments of inertia of the balance wheels and body and the angular stroke of the balance wheels.

10 Claims, 7 Drawing Figures

PATENTED JUL 24 1973 3,747,319

ROTATABLE DISPLAY CLOCK

BACKGROUND OF THE INVENTION

The present invention relates generally to improvements in display devices and it relates particularly to an improved moving clock display device.

Many forms of display devices have been available and proposed which are associated with clocks and motivated by the timing motor which drives the clock hands. These devices generally possess numerous drawbacks and disadvantages. They are generally relatively high energy consuming devices and accordingly require the use of powerful spring wound clock motors or ac clock motors. If a battery energized clock motor is employed the device and clock are highly unreliable and the battery requires frequent replacement. Furthermore the display devices of the above type which were heretofore available are complex and expensive and otherwise leave much to be desired.

SUMMARY OF THE INVENTION

It is thus a principal object of the present invention to provide an improved display device.

Another object of the present invention is to provide an improved moving display device.

Still another object of the present invention is to provide moving display clock.

A further object of the present invention is to provide a moving display clock in which there is no direct mechanical connection between the moving display member and the clock drive motor.

Still a further object of the present invention is to provide a device of the above nature characterized by its attractive display, simplicity, ruggedness, low cost, reliability and high versatility and adaptability.

The above and other objects of the present invention will become apparent from a reading of the following description taken in conjunction with the accompanying drawing which illustrates a preferred embodiment thereof.

In a sense the present invention contemplates the provision of a moving display device comprising a base member, a body member supported on the base member for angular movement about a vertically extending axis and including a vertically extending display face, and a clock motor mounted to the body member and including a balance wheel oscillatable about a vertically extending axis to impart an angular movement to the body member with the oscilation of the balance wheel.

In its preferred form the display device is in the form of a clock, the clock body including a housing mounted atop a base by means of a low friction bearing for free rotation about a vertical axis the housing including a front dial face which is in a plane forming an acute angle to the vertical. A Clock motor energized by a replacable battery is mounted on the rear face of the dial and drives the clock second, minute and hour hands. The clock motor includes a pair of hair spring loaded axially spaced parallel balance wheels oscillatable about a vertical extending axis, aligned magnet members being mounted on the confronting faces of the balance wheels and having parallel longitudinally spaced confronting faces. A pulsing inductor coil is located between the paths of the magnet member faces and is periodically energized by a pulsing network energized by the battery to maintain the oscillation of the balance wheels which drive the clock hands through a gear chain. The oscillating balance wheels cause the clock body to oscillate at an angular stroke which is a function of the moments of inertia of the balance wheels and clock body member and the angular oscillating stroke of the balance wheels.

The improved clock display device is simple, attractive and reliable and requires no energy in addition to that employed in running the clock motor as such for timing purposes.

DESCRIPTION OF THE PREFERRED EMBODIMENT

Figure 1:
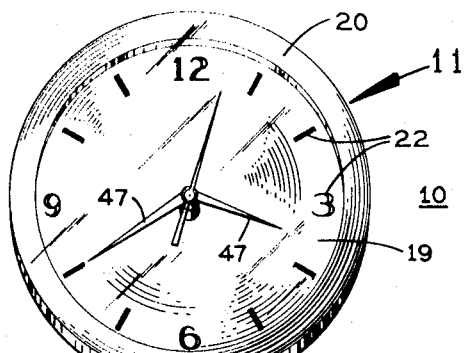
FIG. 1 is a front elevational view of a clock embodying the present invention.

Referring now to the drawing which illustrates a preferred embodiment of the present invention, the reference numeral 10 generally designates the improved display device which is here illustrated in the form of a clock, it being understood that the display device may take other forms and be otherwise applied. The clock 10 includes a body member 11 mounted atop a base 12 for free low friction rotation about a vertical axis.

The base 12 is illustrated as a cube of a synthetic organic polymeric resin although it may be of any desired shape and formed of any suitable material. A centrally positioned stepped well 13 is formed in the top face of base 12 and the outer face of a roller or ball bearing 14 nests in and is secured in the enlarged upper portion of well 13.

The clock body 11 comprises a hollow case or housing 16 including a thin hemispherical shell 17 provided with a forward peripheral cylindrical border 18. The front of housing 16 is closed by a separable circular plate 19 which telescopes the forward section of border 18 and is provided with a forwardly directed integrally formed annular flange or wall 20. A shallow peripheral outwardly projecting lip 21 is medially located on the outer face of wall 20 and abuts the front edge of shell border 18. The front face of plate 19 defines a clock dial and is provided with the usual hour designating numerals and indicia 22. The dial plate 19 extends vertically and lies in a plane which forms an acute angle with the vertical axis of rotation of bearing 14.

A flat horizontal circular boss 23 is formed in the bottom of shell 17 and has a central opening and is sandwiched between a pair of opposite washers 24 the bottom washer resting on the inner run of bearing 14. The assembly of the boss and washers are firmly secured to the bearing inner run by a tubular nut 26 engaged by a screw 27 and axially registering with the aligned openings in the boss and washers and the axial bore in the bearing inner run. A clear transparent shell 28 of a configuration similar to that of shell 17 has a rear border engaging the front outer face of flange 20 with its rear edge abutting lip 21.

A transistorized battery powered clock motor 29 of generally known construction is mounted on the rear face of plate 19 within the housing 16 and includes a case 30 provided at its bottom with a cavity or receptacle 32, for replacably receiving an energizing battery B through the open rear thereof. A spring contact 33 and a snap contact 34 are located on the end walls of receptacle 32 for engaging the negative and positive poles of the conventional B or C dry cell.

The clock motor includes a vertical balance wheel shaft 36 parallel to the medial vertically extending diameter of plate 19 and transversely offset from the axis of rotation of clock body 16, the shaft 36 being pointed at opposite ends and engaged by suitably mounted cup bearings 37 at opposite ends thereof. Mounted on shaft 36 are a pair of axially spaced similar disc shaped balance wheels 38. Mounted on the confronting faces of balance wheels 38 proximate their outer borders are a pair of longitudinally aligned similar block shaped magnet members 39 having longitudinally spaced parallel confronting faces, the wheels 38 being balanced by weights 40 affixed to the confronting faces of wheels 38 diametrically opposite the magnet members 39. A spiral hair spring 41 has its inner end affixed to shaft 36 and its outer end affixed to the free end of an adjustable arm 42 to regulate the timing of balance wheels 38 in the known manner.

A transistorized pulsing network 43 is of known construction and is mounted by means of a panel board 44 in case 30. Pulsing network 43 includes a pulsed inductor coil 46 which lies between the paths of the confronting faces of magnet members 39 and is periodically energized by pulsing network 43 in properly phased relationship to magnet members 39 which oscillate with balance wheels 38 so as to pulse the magnet members 39 and maintain the full oscillation of balance wheels 38, the oscillation stroke of which is approximately 360°. The shaft 36 oscillated by the oscillating balance wheels 38 is provided with drive elements which motivate the clock motor gear train 35 which is provided with coaxial second, minute and hour shafts projecting through a central opening in dial plate 19. Mounted on the respective shafts are second minute and hour hands 47, the hand carrying minute and hour shafts being adjustable in the known manner by a rear knob 48.

Figures 2, 4, 5, 6:
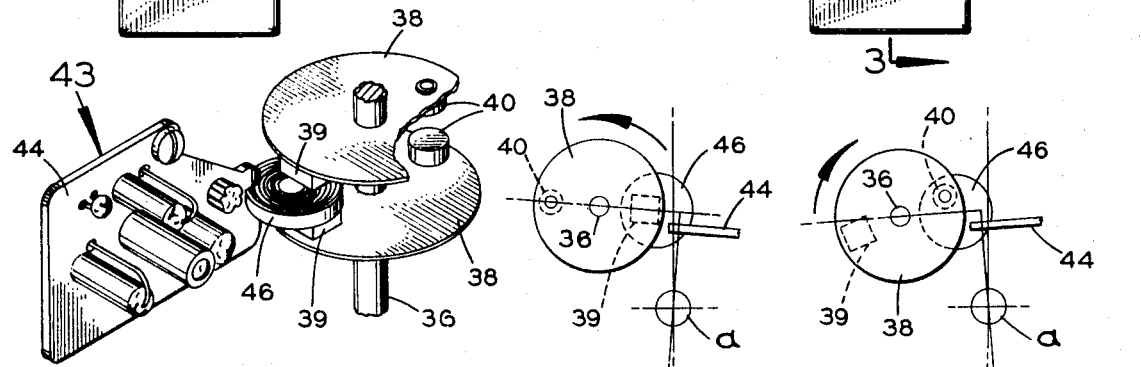
FIG. 2 is a side elevational view thereof shown partially broken away.
FIG. 4 is a fragmented perspective view of the clock motor balance wheel and pulsing network.
FIG. 5 is a schematic plan view showing the relative rotation of the balance wheel and clock body.
FIG. 6 is a view similar to FIG. 5 with the balance wheel shown rotating in an opposite direction.
Figure 3:
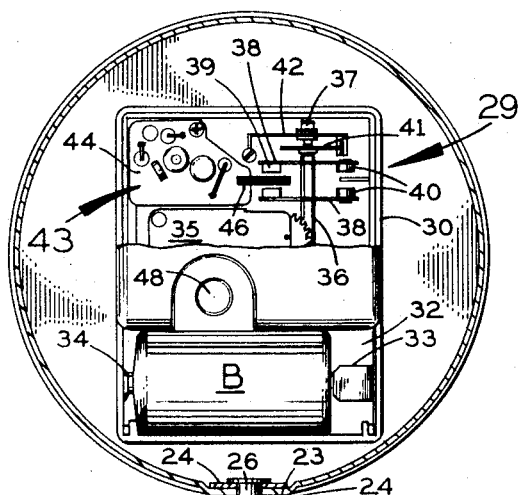
FIG. 3 is a sectional view taken along line 3 — 3 in FIG. 2.
Figure 7:
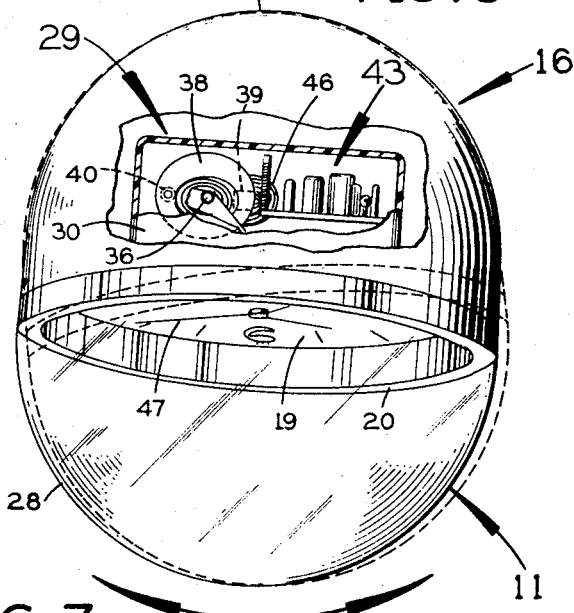
FIG. 7 is a fragmented top plan view of the improved clock.

Considering now the operation of the improved clock display device 10 described above, the fly wheels 38 are maintained in a uniformly oscillating condition by the periodic pulsing of magnet members 39 by the coil 39 which is pulsed by the network 43 energized by battery B. The oscillating balance wheels 38 oscillate the shaft 36 to drive the clock hands. In addition, the weighted oscillating balance wheels rock the clock body member 11 about a verticle axis. The clock body member supporting the oscillating balance wheels in a closed mechanical system which is free to rotate with little friction, as the balance wheels 38 rotate counterclockwise, as shown in FIG. 5 the housing 16 rocks clockwise in opposite and equal reaction thereto to maintain the center of gravity of the clock body member stationary. Similarly, as the balance wheels 38 rotate clockwise, as shown in FIG. 6, the housing 16 rotates counterclockwise. Thus with the oscillation of balance wheels 38 the housing 16 reacts to oscillate.

The angular displacement of the housing 16 during its oscillation decreases with increases in the moment of inertia of the body member 11 and increases with decreases in the moment of inertia, and as related to the balance wheels 38, the angular displacement of the body member 11 increases and decreases respectively with increases and decreases in the moment of inertia of weighted balance wheels 38 and the angular displacement thereof during oscillation. Thus decreases in the weight of body member 11 and the greater concentration of the weight at the rotational axis thereof results in a greater oscillation stroke of the body member 11. The oscillating frequency of body member 11 and balance wheels 38 are the same.

While there has been described and illustrated a preferred embodiment of the present invention, it is apparent that numerous alterations, omissions and additions may be made without departing from the spirit thereof. For example the shapes and configurations of the various members may be modified and decorated as desired and other than battery energized clock motors may be employed. Moreover, the clock body member instead of being supported at its bottom for rotation about a vertical axis may be suspended or otherwise supported for angular movement.

I claim:

1. A moving display device comprising a base member, a body member supported on said base member for angular movement about a vertically extending axis and including a vertically extending display face and a clock motor mounted to said body member and including a balance wheel oscillatable about a vertically extending axis to impart an angular movement to said body member with the oscillation of said balance wheel.

2. The display device of claim 1 wherein said display face comprises a clock dial and including minute and hour hands driven by said clock motor abut the center of said dial.

3. The display device of claim 1 wherein said body member and balance wheel axes are transversely offset from each other.

4. The display device of claim 1 wherein said clock motor includes an electrical network for periodically pulsing said balance wheel.

5. The display device of claim 4 wherein said clock motor includes a vertically extending shaft, a spiral hair spring having an inner end fixed to said shaft and an outer end secured to a stationary point, a pair of axially spaced balance wheels mounted on said shaft and having a pair of confronting magnet elements mounted on the borders thereof, said magnet elements having longitudinally spaced confronting faces, said pulsing network including an inductance coil located between the paths of said magnet elements, and a circuit energizing said coil at predetermined positions of said magnet elements.

6. The display device of claim 5 including a replacable battery energizing said network.

7. The display device of claim 1 comprising a bearing member having a vertical axis and including an outer face embedded in said base and an inner face secured to said body member.

8. The display device of claim 1 wherein the axis of said bearing member is vertical and the axis of said balance wheel is an acute angle with said bearing axis.

9. The display device of claim 8 wherein the axis of said balance wheel is parallel to the plane of said display face.

10. A moving display device comprising a base member, a body member supported on said base member for angular movement about a predetermined axis and including a display face extending along the direction of said axis and a clock motor mounted to said body member and including a balance wheel oscillatable about an axis extending in the direction of said predetermined axis to impart an angular movement to said body member with the oscillation of said balance wheel.

* * * * *